US009797255B2

(12) United States Patent
Baehmann et al.

(10) Patent No.: US 9,797,255 B2
(45) Date of Patent: Oct. 24, 2017

(54) ROTARY MACHINE INCLUDING A MACHINE ROTOR WITH A COMPOSITE IMPELLER PORTION AND A METAL SHAFT PORTION

(71) Applicant: NUOVO PIGNONE S.p.A., Florence (IT)

(72) Inventors: Peggy Lynn Baehmann, Glenville, NY (US); Scott Roger Finn, Niskayuna, NY (US); Andrea Massini, Florence (IT); Iacopo Giovannetti, Florence (IT)

( * ) Notice: Subject to any disclaimer, the term of this patent is extended or adjusted under 35 U.S.C. 154(b) by 550 days.

(21) Appl. No.: 14/365,253

(22) PCT Filed: Dec. 6, 2012

(86) PCT No.: PCT/EP2012/074619
§ 371 (c)(1),
(2) Date: Jun. 13, 2014

(87) PCT Pub. No.: WO2013/087496
PCT Pub. Date: Jun. 20, 2013

(65) Prior Publication Data
US 2014/0341715 A1 Nov. 20, 2014

(30) Foreign Application Priority Data
Dec. 14, 2011 (IT) .............................. CO2011A0064

(51) Int. Cl.
*F04D 29/26* (2006.01)
*F01D 5/02* (2006.01)
(Continued)

(52) U.S. Cl.
CPC ............. *F01D 5/025* (2013.01); *F01D 5/048* (2013.01); *F01D 5/282* (2013.01); *F02C 6/12* (2013.01);
(Continued)

(58) Field of Classification Search
CPC ........ F01D 5/025; F04D 29/20; F04D 29/266; F05D 2260/30
See application file for complete search history.

(56) References Cited

U.S. PATENT DOCUMENTS 2,517,477 A 8/1950 Griffin
2,868,439 A 1/1959 Hampshire et al.
(Continued)

FOREIGN PATENT DOCUMENTS

CN 86101358 A 12/1986
CN 2643047 Y 9/2004
(Continued)

OTHER PUBLICATIONS

International Search Report and Written Opinion dated May 2, 2013 which was issued in connection with the PCT Application No. PCT/EP12/74619 which was filed on Dec. 6, 2012.
(Continued)

*Primary Examiner* — Gregory Anderson
*Assistant Examiner* — Juan G Flores
(74) *Attorney, Agent, or Firm* — GE Global Patent Operation

(57) ABSTRACT

A rotary machine includes a machine stator and a machine rotor rotatable relative to the machine stator and having a metal shaft portion, a composite impeller portion, and at least a first metal ring portion securing the composite impeller portion to the metal shaft portion, the metal ring portion having a first interface with the composite impeller portion and a second interface with the metal shaft portion.

13 Claims, 6 Drawing Sheets

(51) Int. Cl.
  *F01D 5/04* (2006.01)
  *F02C 6/12* (2006.01)
  *F04D 29/02* (2006.01)
  *F04D 29/20* (2006.01)
  *F01D 5/28* (2006.01)

(52) U.S. Cl.
  CPC ......... *F04D 29/023* (2013.01); *F04D 29/026* (2013.01); *F04D 29/20* (2013.01); *F04D 29/266* (2013.01); *F05D 2230/23* (2013.01); *F05D 2300/10* (2013.01); *F05D 2300/603* (2013.01)

(56) References Cited

U.S. PATENT DOCUMENTS

| | | | |
|---|---|---|---|
| 3,189,671 A | 6/1965 | Babb | |
| 3,403,844 A | 10/1968 | Stoffer | |
| 3,554,668 A | 1/1971 | Wagle | |
| 3,680,979 A | 8/1972 | Hansen et al. | |
| 3,846,045 A | 11/1974 | Mincuzzi | |
| 4,183,719 A | 1/1980 | Bozung | |
| 4,243,199 A | 1/1981 | Hill | |
| 4,363,602 A | 12/1982 | Martin | |
| 4,435,126 A | 3/1984 | Schneider | |
| 4,676,722 A | 6/1987 | Marchal et al. | |
| 4,697,987 A | 10/1987 | Katayama et al. | |
| 4,747,722 A | 5/1988 | Kawaguchi et al. | |
| 4,747,900 A | 5/1988 | Angus | |
| 4,767,277 A | 8/1988 | Buse | |
| 4,797,064 A | 1/1989 | Ferris et al. | |
| 4,850,802 A * | 7/1989 | Pankratz | F01D 5/02 228/113 |
| 4,877,376 A | 10/1989 | Sikorski et al. | |
| 5,022,823 A | 6/1991 | Edelmayer | |
| 5,201,635 A | 4/1993 | Steinmetz | |
| 5,263,823 A | 11/1993 | Cabaret et al. | |
| 5,285,699 A | 2/1994 | Walls et al. | |
| 5,435,960 A | 7/1995 | Bressler et al. | |
| 5,449,273 A | 9/1995 | Hertel et al. | |
| 5,538,395 A | 7/1996 | Hager | |
| 5,539,395 A | 7/1996 | Buss et al. | |
| 5,632,601 A | 5/1997 | Bodmer et al. | |
| 5,725,353 A | 3/1998 | Matheny et al. | |
| 5,775,878 A | 7/1998 | Maumus et al. | |
| 5,779,449 A | 7/1998 | Klein | |
| 5,795,138 A | 8/1998 | Gozdawa | |
| 5,800,128 A | 9/1998 | Bodmer et al. | |
| 5,845,398 A | 12/1998 | Maumus et al. | |
| 6,025,072 A | 2/2000 | Goto et al. | |
| 6,033,183 A | 3/2000 | Genster | |
| 6,033,612 A | 3/2000 | Adams et al. | |
| 6,126,395 A | 10/2000 | Shingai | |
| 6,146,094 A | 11/2000 | Obana et al. | |
| 6,264,430 B1 | 7/2001 | Hulkkonen et al. | |
| 6,402,467 B1 | 6/2002 | Godichon et al. | |
| 6,481,917 B1 | 11/2002 | Chen et al. | |
| 6,592,329 B1 | 7/2003 | Hirose et al. | |
| 6,805,531 B2 | 10/2004 | Iida et al. | |
| 6,854,960 B2 | 2/2005 | Van Dine et al. | |
| 6,976,828 B2 | 12/2005 | Godichon et al. | |
| 7,491,032 B1 | 2/2009 | Powell et al. | |
| 8,133,009 B2 | 3/2012 | Salvesen | |
| 2004/0224590 A1 | 11/2004 | Rawa et al. | |
| 2005/0100442 A1 | 5/2005 | Clement | |
| 2006/0291996 A1 | 12/2006 | Kubota et al. | |
| 2007/0098556 A1 | 5/2007 | Sanagi et al. | |
| 2008/0298971 A1 * | 12/2008 | Pinzauti | F04D 29/266 416/204 R |
| 2009/0110556 A1 | 4/2009 | Jahnz et al. | |
| 2009/0142196 A1 | 6/2009 | Gerhardt et al. | |
| 2011/0194941 A1 | 8/2011 | Parkin et al. | |
| 2013/0004316 A1 | 1/2013 | Matwey et al. | |
| 2013/0017067 A1 | 1/2013 | Cantelli et al. | |

FOREIGN PATENT DOCUMENTS

| | | |
|---|---|---|
| CN | 1842657 A | 10/2006 |
| CN | 101315083 A | 12/2008 |
| CN | 201507475 U | 6/2010 |
| DE | 2027861 A1 | 12/1971 |
| DE | 8519005 U1 | 2/1986 |
| DE | 3711489 A1 | 10/1987 |
| DE | 4139293 A1 | 6/1993 |
| DE | 4409629 A1 | 9/1994 |
| DE | 10039971 A1 * | 8/2000 |
| DE | 10104170 A1 | 8/2002 |
| DE | 202005021324 U1 | 10/2007 |
| EP | 0206031 A1 | 12/1986 |
| EP | 0754863 A1 | 1/1997 |
| EP | 0800012 A2 | 10/1997 |
| EP | 0995538 A1 | 4/2000 |
| EP | 0995538 A1 * | 4/2000 |
| EP | 2325495 A2 | 5/2011 |
| GB | 1386937 A | 3/1975 |
| GB | 2258032 A | 1/1993 |
| JP | 35020565 Y | 8/1960 |
| JP | 5428007 A | 3/1979 |
| JP | 5434107 A | 3/1979 |
| JP | 56132499 A | 10/1981 |
| JP | 59150997 A | 8/1984 |
| JP | 61252895 A | 11/1986 |
| JP | 62279913 A | 12/1987 |
| JP | 6329098 A | 2/1988 |
| JP | 03141898 A | 6/1991 |
| JP | 03210024 A | 9/1991 |
| JP | 03106195 U | 11/1991 |
| JP | 0763193 A | 3/1995 |
| JP | 08224748 A | 9/1996 |
| JP | 094598 A | 1/1997 |
| JP | 09105304 A | 4/1997 |
| JP | 09126185 A | 5/1997 |
| JP | 09195987 A | 7/1997 |
| JP | 09510529 A | 10/1997 |
| JP | 11324982 A | 11/1999 |
| JP | 11324983 A | 11/1999 |
| JP | 2001124101 A | 5/2001 |
| JP | 2001140789 A | 5/2001 |
| JP | 2004036444 A | 2/2004 |
| JP | 2006161635 A | 6/2006 |
| JP | 2007312576 A | 11/2007 |
| JP | 2009510305 A | 3/2009 |
| RU | 2113626 C1 | 6/1998 |
| RU | 2231414 C2 | 6/2004 |
| RU | 2239100 C2 | 10/2004 |
| RU | 2280530 C1 | 7/2006 |
| RU | 2280767 C2 | 7/2006 |
| RU | 2290285 C2 | 12/2006 |
| RU | 2296245 C1 | 3/2007 |
| SU | 879045 A1 | 11/1981 |
| SU | 1565574 A1 | 5/1990 |
| SU | 1701984 A1 | 12/1991 |
| WO | 2011063333 A1 | 5/2011 |

OTHER PUBLICATIONS

Italian Search Report and Written Opinion dated Jun. 6, 2012 which was issued in connection with the Italian Application No. CO2011A000064 which was filed on Dec. 14, 2011.
Unofficial English Translation of Chinese Office Action issued in connection with corresponding CN Application No. 201280061611.6 dated Feb. 4, 2015.
Orlov, "Thermal Shrink Fit", Shrink-Fitted Joints, pp. 236-237.
Unofficial English Translation of Japanese Office Action issued in connection with corresponding JP Application No. 2014546420 dated Sep. 20, 2016.
Unofficial English Translation of Russian Office Action issued in connection with corresponding RU Application No. 2014121784 dated Sep. 27, 2016.
Unofficial English translation of Italian Search Report and Written Opinion issued in connection with related IT Application No. MI2009A000781 dated Nov. 18, 2009.

(56) References Cited

OTHER PUBLICATIONS

Unofficial English translation of Italian Search Report and Written Opinion issued in connection with related IT Application No. CO2009A000049 dated Jun. 24, 2010.
Unofficial English translation of Italian Search Report and Written Opinion issued in connection with related IT Application No. CO2009A000050 dated Jul. 15, 2010.
PCT Search Report and Written Opinion issued in connection with related PCT Application No. PCT/EP2010/056289 dated Jul. 28, 2010.
European Search Report and Opinion issued in connection with related EP Application No. 10162055.7 dated Sep. 2, 2010.
PCT Search Report and Written Opinion issued in connection with related PCT Application No. PCT/US2010/057623 dated Mar. 31, 2011.
PCT Search Report and Written Opinion issued in connection with related PCT Application No. PCT/US2010/057626 dated Apr. 28, 2011.
Unofficial English translation of Chinese Office Action issued in connection with related CN Application No. 201080030778.7 dated Oct. 24, 2013.
Unofficial English translation of Kazakhstan Office Action issued in connection with related KZ Application No. 2012/1556.1 dated Dec. 5, 2013.
Unofficial English translation of Kazakhstan Office Action issued in connection with related KZ Application No. 2012/1557.1 dated Dec. 5, 2013.
Unofficial English translation of Japanese Office Action issued in connection with related JP Application No. 2012-509058 dated Feb. 25, 2014.
Unofficial English translation of Russian Office Action issued in connection with related RU Application No. 2011144881 dated Mar. 19, 2014.
Unofficial English translation of Kazakhstan Notice of Allowance issued in connection with related KZ Application No. 2012/1557.1 dated May 28, 2014.
U.S. Non-final Office Action issued in connection with related U.S. Appl. No. 13/319,493 dated Jun. 11, 2014.
Unofficial English translation of Chinese Office Action issued in connection with related CN Application No. 201080062113.4 dated Jun. 26, 2014.
Unofficial English translation of Chinese Office Action issued in connection with related CN Application No. 201080062105.X dated Jul. 3, 2014.
Unofficial English translation of Mexican Office Action issued in connection with related MX Application No. MX/A/2012/005950 dated Jul. 17, 2014.
Unofficial English translation of Russian Office Action issued in connection with related RU Application No. 2011144881 dated Jul. 30, 2014.
Unofficial English translation of Chinese Office Action issued in connection with related CN Application No. 201080030778.7 dated Jul. 31, 2014.
Unofficial English translation of Egyptian Office Action issued in connection with related EG Application No. PCT/921/2012 dated Aug. 20, 2014.
Unofficial English translation of Egyptian Office Action issued in connection with related EG Application No. PCT/922/2012 dated Aug. 20, 2014.
Unofficial English translation of Italian Search Report and Written Opinion issued in connection with related IT Application No. CO2013A000067 dated Sep. 17, 2014.
Unofficial English translation of Japanese Office Action issued in connection with related JP Application No. 2012541139 dated Sep. 24, 2014.
Unofficial English translation of Russian Office Action issued in connection with related RU Application No. 2012122728 dated Sep. 24, 2014.
Unofficial English translation of Russian Office Action issued in connection with related RU Application No. 2012120919 dated Sep. 26, 2014.
Unofficial English translation of Japanese Office Action issued in connection with related JP Application No. 2012509058 dated Oct. 21, 2014.
Unofficial English translation of Japanese Office Action issued in connection with related JP Application No. 2012541140 dated Oct. 21, 2014.
Unofficial English translation of Mexican Office Action issued in connection with related MX Application No. MX/A/2012/005955 dated Oct. 28, 2014.
Unofficial English translation of Egyptian Office Action issued in connection with related EG Application No. PCT921/2012 dated Dec. 17, 2014.
Unofficial English translation of Russian Office Action issued in connection with related RU Application No. 2011144881 on Dec. 23, 2014.
Unofficial English translation of Japanese Office Action issued in connection with related JP Application No. 2012541140 dated Feb. 10, 2015.
PCT Search Report and Written Opinion issued in connection with related PCT Application No. PCT/EP2014/077707 dated Mar. 26, 2015.
Unofficial English translation of Japanese Notice of Allowance issued in connection with related JP Application No. 2012541140 dated May 26, 2015.
Australian Office Action issued in connection with corresponding AU Application No. 2010321705 dated Jun. 29, 2015.
Unofficial English translation of Japanese Office Action issued in connection with related JP Application No. 2012541139 dated Jul. 7, 2015.
Australian Office Action issued in connection with related AU Application No. 2010321706 dated Jul. 10, 2015.
Unofficial English translation of Egyptian Office Action issued in connection with related EG Application No. PCT922/2012 dated Jul. 25, 2015.
Unofficial English translation of Japanese Office Action issued in connection with related JP Application No. 2012509058 dated Aug. 4, 2015.
Unofficial English Russian Notice of Allowance issued in connection with related RU Application No. 2012122728 dated Aug. 26, 2015.
Unofficial English translation of Russian Office Action issued in connection with related RU Application No. 2011144881 dated Sep. 21, 2015.
U.S. Non-Final Office Action issued in connection with related U.S. Appl. No. 13/511,627 dated Dec. 21, 2015.
Unofficial English translation of Japanese Notice of Allowance issued in connection with related JP Application No. 2012509058 dated Feb. 23, 2016.
Australian Notice of Allowance issued in connection with related AU Application No. 2010321705 dated Apr. 11, 2016.
U.S. Final Office Action issued in connection with related U.S. Appl. No. 13/511,627 dated Jun. 15, 2016.
European Office Action issued in connection with related EP Application No. 10808954.1 dated Oct. 21, 2016.
Unofficial English translation of Japanese Office Action issued in connection with related JP Application No. 2012541139 dated Dec. 6, 2016.
U.S. Non-Final Office Action issued in connection with corresponding U.S. Appl. No. 14/642,844 dated Feb. 17, 2017.
Unofficial English translation of Japanese Office Action issued in connection with related JP Application No. 2014546420 dated Mar. 14, 2017.
U.S. Notice of Allowance issued in connection with corresponding U.S. Appl. No. 13/511,627 dated Mar. 24, 2017.

\* cited by examiner

Section A-A

Section A-A ern is shown in FIG. 1. Rotary

ROTARY MACHINE INCLUDING A MACHINE ROTOR WITH A COMPOSITE IMPELLER PORTION AND A METAL SHAFT PORTION

BACKGROUND

Technical Field

Embodiments of the subject matter disclosed herein generally relate to rotary or turbo machines including a machine rotor with an impeller portion made of a first material and a shaft portion made of a second material different from the first material, and more particularly, to a machine rotor with a composite impeller portion and a metal shaft portion.

Discussion of the Background

During the past years, with the increase in price of fossil fuels, the interest in many aspects related to the processing of fossil fuels has increased. During processing of fossil fuels, fluids are transported from on-shore or offshore locations to processing plants for subsequent use. In other applications, fluids may be transported more locally, for example, between sub-systems of a hydrocarbon processing plant to facilitate distribution to end-users.

At least some fluid transport stations use rotary machines, such as compressors, fans and/or pumps that are driven by gas turbines. Some of these turbines drive the associated fluid transport apparatus via a gearbox that either increases or decreases a gas turbine output drive shaft speed to a predetermined apparatus drive shaft speed. In other rotary machines, electrically-powered drive motors, or electric drives are used in place of (or in conjunction) with mechanical drives (i.e., gas turbines) to operate the rotary machine. Regardless of the particular setting, i.e. on-shore, off-shore, etc. and regardless of whether the rotary machine is turbine or motor driven, there is an ever present need to increase the efficiency, decrease the costs, and reduce the environmental impact of fossil fuel processing, and in particular, of rotary machines involved in such processing.

As a result of this ever present need, much progress has been made in the development of new materials which may potentially be used in the manufacture of rotary machines. Metals such as new alloys, non-metals such as new textiles, and other new materials consisting of both metals and non-metals offer significant advantages over materials more conventionally associated with rotary machine manufacture.

However, the incorporation of these materials to new or existing rotary machines has proved challenging. More specifically, these materials oftentimes behave differently, both during assembly and during operation of the rotary machine, from the more conventional materials which they may replace. Accordingly, there is a need for a rotary machine which is capable of incorporating diverse materials into newly manufactured or existing components thereof.

SUMMARY

According to an exemplary embodiment a rotary machine includes a machine stator and a machine rotor rotatable relative to the machine stator. The machine rotor has a metal shaft portion, a composite impeller portion, and at least a first metal ring portion securing the composite impeller portion to the metal shaft portion, the metal ring portion having a first interface with the composite impeller portion and a second interface with the metal shaft portion.

According to another exemplary embodiment a machine rotor includes a metal shaft and a composite impeller including an attachment portion. A metal ring is shrink fit to the attachment portion and the metal shaft to secure the composite impeller to the metal shaft.

According to another exemplary embodiment a method of securing a composite impeller to a metal shaft of a machine rotor includes positioning the composite impeller on the metal shaft, heating at least a first metal ring, positioning the metal ring onto the metal shaft, allowing the metal ring to cool and shrink into engagement with the composite impeller and the metal shaft to secure the composite impeller to the metal shaft.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a rotary machine that has a stator and a rotor. However, the embodiments to be discussed next are not limited to these exemplary systems, but may be applied to other systems.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
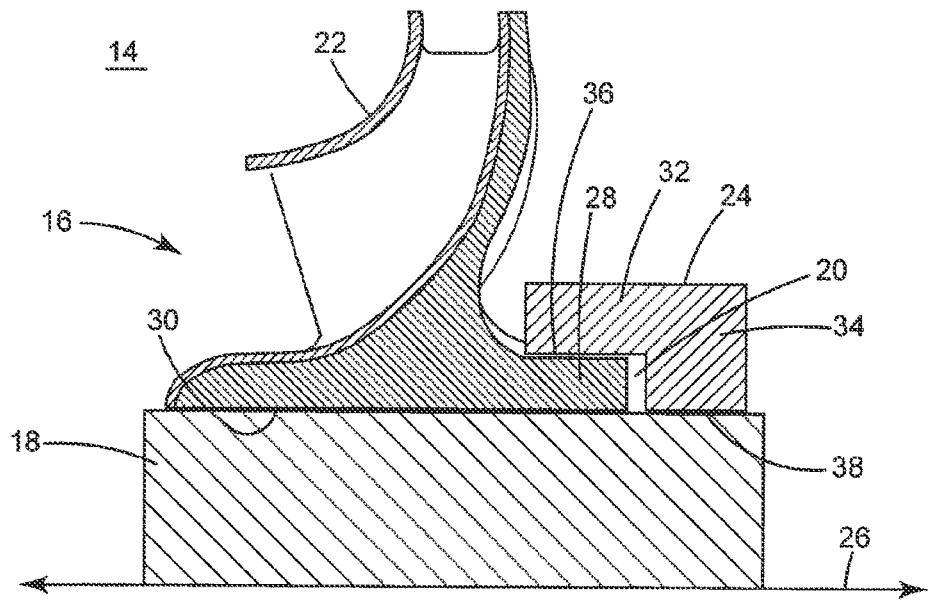
FIG. 1 is a cross-sectional view of a rotary machine according to an exemplary embodiment.

An exemplary embodiment of a rotary machine 14 according to the present invention is shown in FIG. 1. Rotary or turbo machine 14 includes a machine rotor 16 which is rotatable relative to a machine stator such as a housing (not shown).

As shown in FIG. 1, machine rotor 16 includes a metal shaft portion 18 and a composite impeller portion 22. Composite impeller portion 22 includes a composite of materials. For example, composite impeller portion 22 may include both metal and non-metal materials. Non-metal materials may include (but are not limited to) fabric material including fibers, such as carbon or glass fibers, which are oriented, non-oriented, or a combination of oriented and non-oriented fibers. Moreover, the fibers of the fabric material or materials may be of the same material or a blend of various materials. The fibers of the fabric material may be impregnated with a filling material. Filling materials may include (but are not limited to) thermoplastic polymers, including (but not limited to) PPS (polyphenylene sulphide), PA (polyamide), PMMA (acrylic), LCP (liquid crystal polymer), POM (acetal), (PAI) polyamide imide, PEEK (poly ether ether ketone), PEKK (poly ether ketone ketone), PAEK (polyaryletherketone), PET (polyethylene tereptalato), PC (polycarbonate), PE (polyethylene), PEI (polyetherimide), PES (polyether), PPA (poliptalamide), PVC (polyvinyil chloride), PU (polyurethane), PP (polypropylene), PS (polystyrene), PPO (polifenilene oxide), PI (polyimide), and other materials. For particular high temperature applications other materials such as, polyimides, including (but not limited to) polymerized monomeric reactant (PMR) resins, 6F-Polyimides with a phenylethynyl endcap (HFPE) and phenylethynyl-terminated imide (PETI) oligomers may also be incorporated into the makeup of composite impeller portion 22.

Composite impeller portion 22 may also include filling materials such as thermosetting compounds including (but not limited to) Epoxy, phenolic, polyester, vinylester, Amin, furans, PI, BMI (Bismaleimides), CE (cyanate ester), Pthalanonitrile, benzozazines and others. For high temperature applications, thermosetting compounds such as polymerized monomeric reactant (PMR) resins, 6F-Polyimides with a phenyl phenylethynyl endcap (HFPE) and phenylethynyl-terminated imide (PETI) oligomers may also be incorporated into the makeup of composite impeller portion 22.

Other materials which may be incorporated into the makeup of composite impeller portion include (but are not limited to) ceramic materials, for example, silicon carbide or alumina, and/or metals, for example, aluminum, titanium, magnesium, nickel, copper and/or alloys including these metals.

For a further description of materials which may be present in composite impeller portion 22 as well as a description of a molding process including such materials, the interested reader is referred to commonly owned published PCT Application PCT/US2010/057623 (published as WO 2011/063333 A1) which is herein incorporated by reference.

In the embodiment shown in FIG. 1, composite impeller portion 22 is secured to metal shaft portion 18 by a metal ring portion 24 which engages both composite impeller portion 22 and metal shaft portion 18.

Composite impeller portion 22 is provided with an attachment portion 28 including an inner surface 30 defining a passage configured to allow the composite impeller portion 22 to be positioned on metal shaft portion 18. Metal ring portion 24 is provided with a first portion 32 having an inner surface 42 (FIG. 2) which engages the attachment portion 28 at a rear side of composite impeller portion 22. Metal ring portion 24 also includes a second portion 34 having an inner surface 44 (FIG. 2) which engages metal shaft portion 18.

Figure 2:
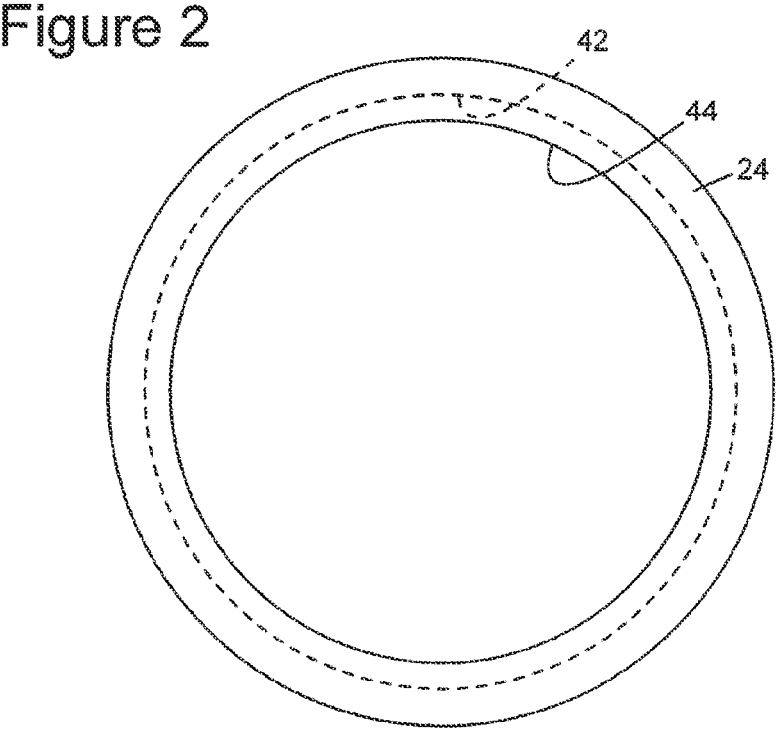
FIG. 2 is an end view of a metal ring portion according to the exemplary embodiment shown in FIG. 1.

As shown in FIG. 2, inner surface 42 and inner surface 44 of ring portion 24 each define a passage having a cylindrical cross-section complementary to the cylindrical outer surface of the attachment portion 28 and the shaft portion 18, respectively. However, and as will be described further below, other configurations may be implemented, for example, the first portion passage and the attachment portion passage may define a non-cylindrical shape such as a polygonal shape. Moreover, the passages may vary in the longitudinal direction as well, for example, the passages may taper.

During assembly of the exemplary embodiment shown in FIG. 1, metal ring portion 24 is shrink fit to the attachment portion 28 and shaft portion 18 to secure the composite impeller portion to the metal shaft. More specifically, metal ring portion 24 is heated to cause an increase in the cross-sectional area of the passage defined by the inner surface 42 of ring first portion 32 and the cross-sectional area of the passage defined by the inner surface 44 of ring second portion 34. After the cross-sectional area of the passages is sufficiently increased, ring portion 24 is positioned such that first portion 32 is located over attachment portion 28 and second portion 34 is positioned over metal shaft portion 38. Ring portion 24 is then allowed to cool and contract such that first portion 32 engages attachment portion 28 along an interface 36 and second portion 34 engages metal shaft portion 18 along an interface 38.

The force exerted by first portion 32 against attachment portion 28 may be configured to provide certain characteristics, and as will be discussed in greater detail below, these characteristics may be enhanced by further features and/or structure provided at interface 36. More specifically, the force exerted by first portion 32 against attachment portion 28 may be configured such that relative rotational movement between first portion 32 and attachment portion 28, so called "twist slippage" may be allowed, resisted or prevented. Also, relative axial movement, so-called "axial slippage", between metal ring 24 and shaft portion 18 relative to shaft axis 26 may also be allowed, resisted or prevented by configuring the force exerted by first portion 32 against attachment portion 28. Similarly, the force exerted by second portion 34 against shaft 18 may be configured such that relative rotational and/or axial movement between second portion 34 and metal shaft 18 may be allowed, resisted or prevented.

As mentioned above, these forces may be configured to provide a resistance to relative movement between first portion 32 and attachment portion 28, and/or a resistance to relative movement between second portion 34 and shaft 18. For example, a safety function may be implemented wherein if a particularly high rotational load on the composite impeller portion 22 or the shaft portion 18 surpasses a certain threshold, for example, an impulse torque threshold, then relative rotational movement may occur during the impulse thereby preventing damage to composite impeller portion 22.

As another example, relative axial movement may be configured to occur in the event of an axial thrust impulse being greater than a certain threshold. Since such movement may be particularly problematic due to a potential clearance problem between the composite impeller portion 22 and the rotary machine housing, a stop may be provided to limit the total amount of relative axial movement. For example, and as shown in FIG. 1, the gap 20 between attachment portion 28 and second portion 34 of metal ring portion 24 may be configured such that upon contact of attachment portion with second portion 34 further relative axial movement is prevented. Also, the resistance to relative axial movement at interface 38 may be configured to be magnitudes greater than the resistance to such movement at interface 36 since no such limit stop is provided at interface 38.

As another example, metal ring portion 24 may be configured to provide redundant force at interface 36 and/or interface 38. More specifically, metal ring portion 24 may be configured such that the force of first portion 32 against attachment portion 28 is sufficient to prevent relative rotational and relative axial movement between composite impeller portion 22 and shaft portion 18. Further, metal ring portion 24 may also be configured such that the force of second portion 34 against metal shaft portion 18 prevents relative rotational and relative axial movement between metal ring portion 24 and shaft portion 18. This configuration may be used to provide a fail-safe function. Specifically, in the event that relative movement were possible between attachment portion 28 and metal shaft portion 18, the redundant force at interface 38 would continue to prevent any such movement due to the force of second portion 34 against metal shaft portion 18.

Further structure or features at, near, or in interface 36 and/or 38 include (but are not limited to), splines, keys, surface textures, wear indicators, additives, shims, insulators, etc. These features and/or structures may be implemented at interface 36 and/or interface 38, for example, to reduce wear, reduce vibration, reduce corrosion, increase efficiency, and otherwise improve the assembly, operation, longevity, and/or costs associated with operating rotary machine 14.

For example, some materials used in the construction of composite impeller portion 22, and particularly, in attachment portion 28 may be prone to heat related damage. In order to prevent such damage, an insulator may be provided at interface 36, or, as another example, a material, such as an additive or a layer such as a shell may be provided to the composite impeller portion 36.

Securing composite impeller portion 22 to metal shaft portion 18 with ring portion 24 provides a number of other specific benefits. For example, composite impeller portion 22 may be positioned on the shaft portion 26 without preheating. In other words, composite impeller portion 22 may, but need not be preheated to facilitate positioning on shaft portion 18. Therefore, materials which may be incorporated in composite impeller portion 22 are not restricted to those which must be able to successfully undergo a preheating or a shrink fitting process for installation.

As another example, if a composite impeller portion 22 including an impregnated fiber material exhibits a certain fiber orientation, interfaces 36 and 38 may be configured to accommodate such fiber orientation. In an embodiment, fibers in the impeller portion 24 are oriented during manufacture to provide a lightweight but somewhat less rigid attachment portion 28. In such case, the force of first portion 32 against attachment portion 28 may be reduced in such manner that relative rotational and axial movement is prevented at interface 36 but such rotational and/or axial movement is not prevented between attachment portion 28 and shaft 18. To accommodate the reduced force at interface 36, the force at second interface 38 may be increased or otherwise configured to prevent relative rotational and axial movement between impeller portion 22 and metal shaft 18.

Metal ring portion 24 may also be configured to control the behavior of composite impeller 22 during operation. For example, at high rotational speeds, some composite material or materials in the impeller portion 22 may tend to plastically or elastically deform due to the forces induced by rotation, e.g., centrifugal forces, the temperature of the process fluid, fatigue, etc. By configuring the area defined by interfaces 36 and/or 38 and/or configuring the forces exerted by ring portion 24 at interface 36 and/or 38, the deformation of composite impeller portion 22 may be controlled. For example, during operation of the exemplary embodiment shown in FIG. 1, the force exerted by first ring portion 32 against attachment portion 28 at interface 36 may prevent the radial outward deformation of impeller portion 22 and particularly, attachment portion 28. Moreover, the resistance to "twist slippage" between the attachment portion 28 and ring portion 32 may actually be increased in proportion to machine rotor 16 rotational speed since greater friction at interface 36 is created by the outward pressure of attachment portion 28 against ring portion 32 during such operation.

In certain circumstances, it may be necessary to configure ring portion 24 to allow impeller portion 22 to deform during operation. This allowable deformation may provide impeller portion 22 with the capability of absorbing impact from foreign matter within a process fluid, or as another example, to absorb a localized pressure phenomena, without jeopardizing operation of rotary machine 14. Note that in the embodiment shown in FIG. 1, since only a first metal ring portion is provided at a rear side thereof, impact or pressure phenomena may be absorbed by composite impeller portion 22, specifically, at least a portion of composite impeller portion 22 may cantilever against ring portion 24 and temporarily bend or deform away from the metal shaft portion 18 to prevent damage. This feature allows for the introduction of an even greater diversity of materials to the manufacture of impeller portion 22.

It is also important to note that because metal ring portion 24 is capable of providing a clamping force to the attachment portion 28 as well as the metal shaft portion 18, a greater amount of torque may be transmitted between impeller portion 22 and shaft portion 18 than if only the impeller portion itself were heat shrunk or otherwise secured to the shaft portion 18. This feature facilitates implementation of a closed composite impeller portion 22, as shown in FIG. 1, which may be associated with higher torque ratings.

Further, since metal ring portion 24 forms a continuous ring around attachment portion 28, the implementation of a multi-piece impeller is facilitated. Thus, for example, an impeller portion including discrete sections may be positioned on metal shaft portion 18. The discrete sections may be secured to metal shaft portion 18 with metal ring portion 24. Such a configuration would allow for easy replacement of only a single section of impeller portion 22, thereby introducing significant cost savings over replacement of an entire impeller, or as another example, discrete impeller portions, each made of a different composite material may be capable of simultaneous live testing with a metal ring portion 24 according to the exemplary embodiment of FIG. 1.

Figure 3:
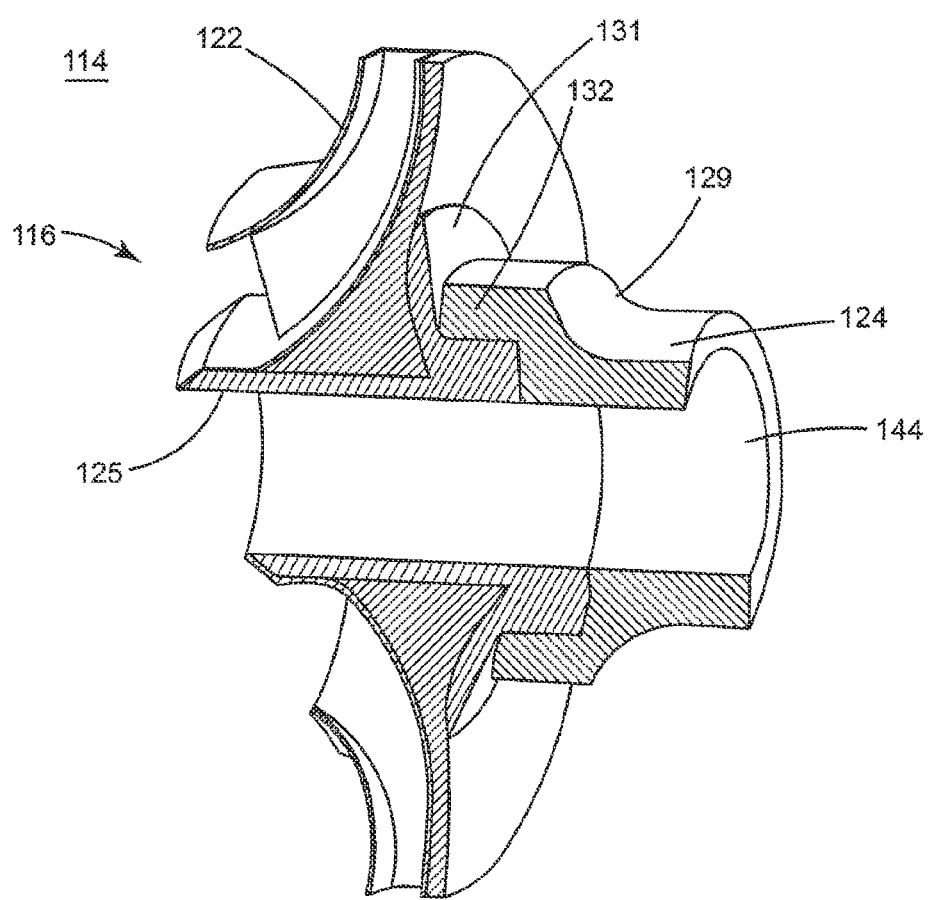
FIG. 3 is a cross-sectional view of a rotary machine according to another exemplary embodiment.

A second exemplary embodiment is shown in FIG. 3. Rotary machine 114 includes a composite impeller portion having a metal attachment portion which may be connected to composite impeller portion, for example, by adhesive or by bonding during the manufacture of composite impeller portion 122. The metal attachment portion includes a hub portion 125 and a radially extending portion 131 which extends radially outwardly from hub portion 125. In the exemplary embodiment, radially extending portion 131 extends beyond a top surface of first ring portion 132 and thereby may provide additional support and/or structural integrity to composite impeller portion 122. This feature also provides an insulating function—during the process of shrink fitting metal ring portion 124 to the metal shaft (not shown), metal attachment portion, and particularly, radially extending portion 131 may protect composite impeller portion from the heat emanating from metal ring portion 124. As shown in FIG. 3, the metal attachment portion is fully seated to metal ring portion 124.

Figure 4:
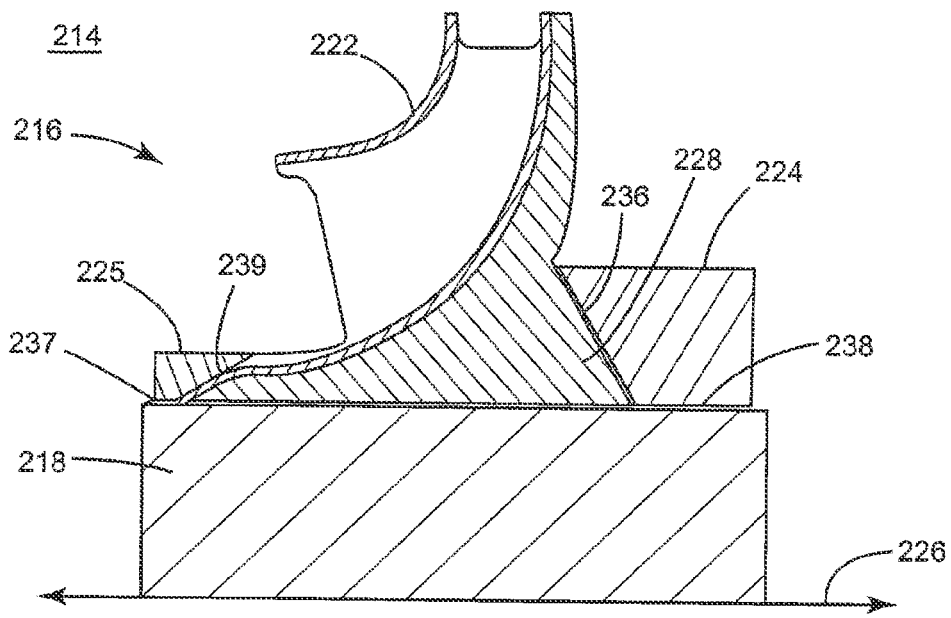
FIG. 4 is a cross-sectional view of a rotary machine according to another exemplary embodiment.

A third exemplary embodiment is shown in FIG. 4. Rotary machine 214 includes a first metal ring portion 224 positioned at a rear side of composite impeller portion 222 and a second metal ring portion 225 positioned at a front side of composite impeller portion 222. In this exemplary embodiment, attachment portion 228 is provided with a dovetail shape. Further, and as shown in FIG. 4, the first interface 236 defines a substantially frustoconical shape and is contiguous with the second interface 238 which defines a tube shape. Similarly, second metal ring portion 225 engages attachment portion 228 at a front side of composite impeller portion 222 and includes a first interface 237 which defines a substantially frustoconical shape and is contiguous with the second interface 239 which defines a tube shape. (237 is incorrectly labeled as 239 in FIG. 4)

During assembly of machine rotor 216, first metal ring portion 224 may be shrink fit to shaft 218 in the absence of composite rotor portion 222. After first metal ring portion 224 has sufficiently cooled, composite impeller portion 222 may be positioned on shaft 218 and into engagement with metal ring portion 224 thereby preventing composite impeller portion from exposure to heat associated with the shrink fitting process. Metal ring portion 225 may then be shrink fit to shaft 218 and attachment portion 228 to secure the composite impeller to the shaft 218. Note that since metal ring portion 225 is somewhat smaller than metal ring portion 224, the exposure of composite impeller portion to potentially damaging heat is significantly less than that associated with metal ring portion 224. As another alternative, first metal ring 224 and/or second metal ring may secure composite impeller 222 to metal shaft 218 by way of cooperating structures or features at interface 236, 238, 237, and/or 239, including threading, swaging, welding, keys, bonding, or other types of chemical or mechanical securing means.

Figure 5:
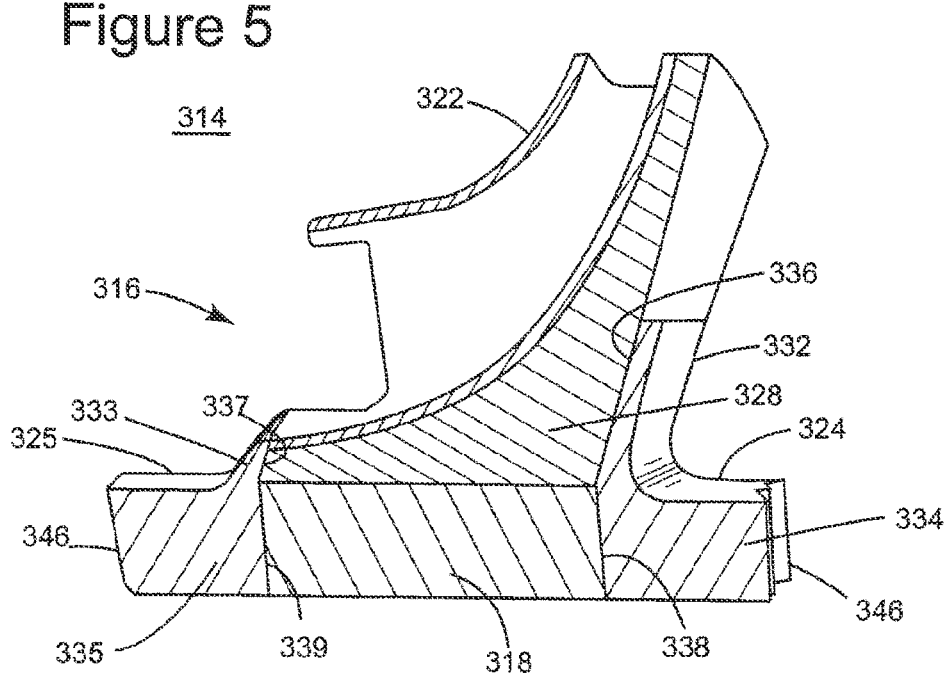
FIG. 5 is a cross-sectional view of a rotary machine according to another exemplary embodiment.

FIG. 5 shows a fourth exemplary embodiment. Rotary machine 314 includes a first metal ring portion 324 positioned at rear side of composite impeller portion 322 and a second metal ring portion 325 positioned at a front side of composite impeller portion 322. In the embodiment shown in FIG. 5, a metal shaft portion 318 is disposed between metal ring portion 324 and metal ring portion 325.

The first portion of 332 of metal ring 334 and the first portion 333 of metal ring 335 extend radially outwardly from second ring portion 334 and second ring portion 335, respectively. Also, interface 336 and interface 337 are contiguous with radial interfaces 338 and 339, respectively. Bonding, such as adhesive bonding, may be provided at interfaces 336, 338, 337, and 339. Additionally, composite impeller portion 322 may be bonded to shaft portion 318.

Note that the second ring portions 334 and 335 each include radially extending teeth or splines 346 for torque transmission axially along machine rotor 316. A similar spline arrangement and/or a key and keyway arrangement may be provided at interfaces 336, 338, 337, and 339 for torque transmission. In addition to the torque transmission provided by chemical or mechanical means at interfaces 336, 338, 337, and 339, a tie-rod (not shown) and/or a bolt (not shown), and/or combinations thereof, may be implemented along the shaft axis of machine rotor 316 to provide a compressive force along the shaft axis in a "Hirth Coupling" arrangement to supplement the torque transmission provided via interfaces 336, 338, 337, and/or 339 and the teeth or splines 346.

Figure 12:
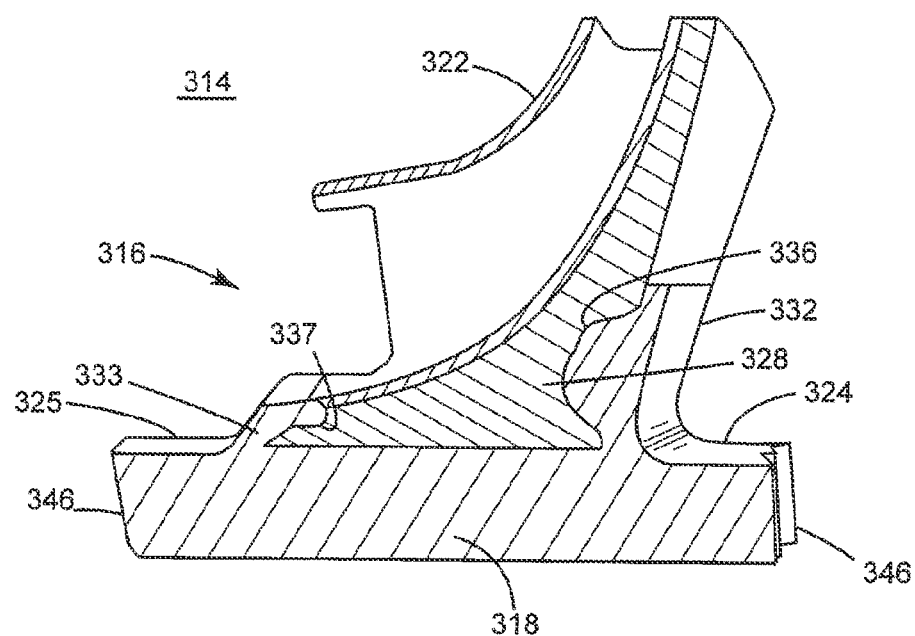
FIG. 12 is a cross-sectional view of a rotary machine according to another exemplary embodiment.

Various modifications of the embodiment of FIG. 5 are also contemplated. For example, it will be appreciated by those skilled in the art that although components 318, 334 and 335 are illustrated in the embodiment of FIG. 5 as being separate elements, that these elements could instead be formed as a single part. Joining of the composite elements to the metal part 318, 334 and 335 can then be directly performed when the composite is formed, wherein the metal part 318, 334 and 335 is used as a mold in the process. Moreover, the surfaces or interfaces 336 and 337 need not be straight, but one or more of these interfaces 336 and 337 could alternatively be curved, e.g., in order to provide for both an adhesive bonding and a geometrical bonding between composite and metal. A purely illustrative example of such curved interfaces 336 and 337 is provided as FIG. 12 (which also shows a single metal part 318).

Figure 6:
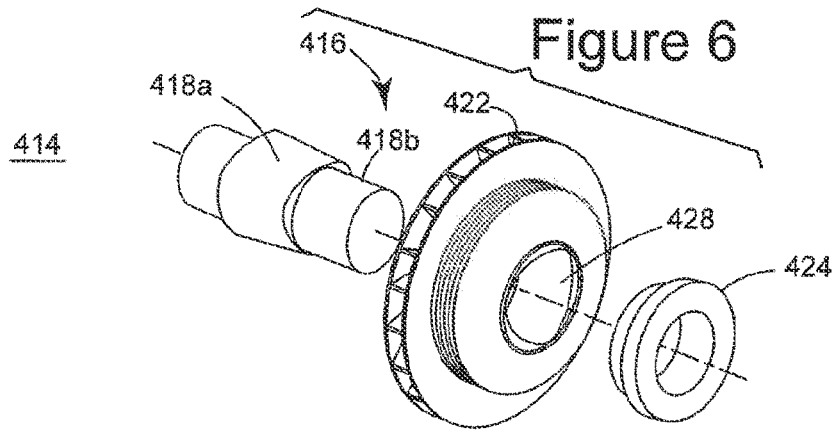
FIG. 6 is a perspective view of a rotary machine according to another exemplary embodiment.
Figure 7:
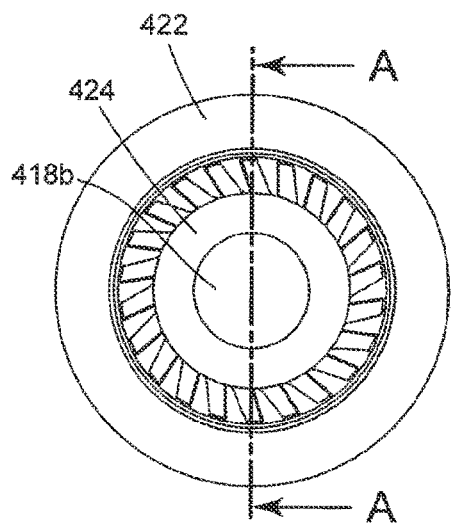
FIG. 7 is an end view of the rotary machine shown in FIG. 6.
Figure 8:
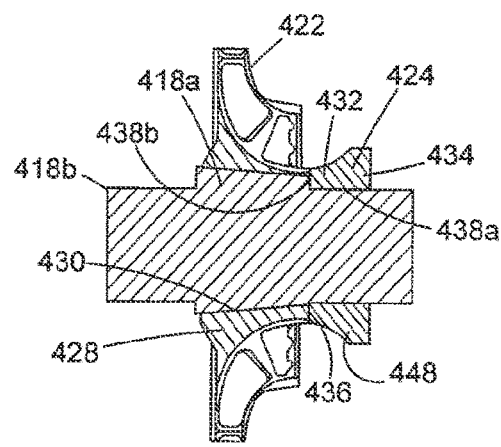
FIG. 8 is a cross-sectional view of the rotary machine shown in FIG. 6 along the line A-A in FIG. 7.
Figure 9:
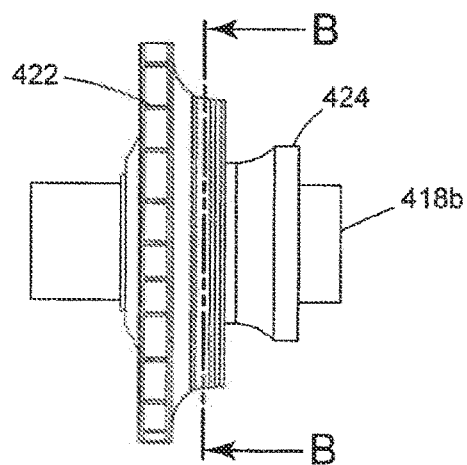
FIG. 9 is a side view of the rotary machine shown in FIG. 6.
Figure 10:
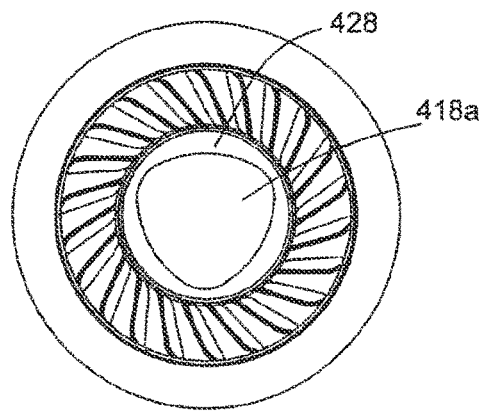
FIG. 10 is a cross-sectional view of the rotary machine shown in FIG. 6 along the line B-B in FIG. 9.

Still further, the metal part, e.g., the surface in contact with the composite part, is not limited to being cylindrical in shape but may take any desired shape, e.g., a three-sided polygonal shape with rounded corners (as is further illustrated in FIG. 6 described below) or other polygonal shapes including 2 sided (elliptical), 4 sided, 5 sided, etc.

FIGS. 6 through 10 show a fifth embodiment. Machine rotor 416 includes a metal shaft portion 418a having a cross-section defining a three sided polygonal shape with rounded corners. Note that the metal shaft portion 418a also tapers along its longitudinal axis. Metal shaft portion 418a transitions at each end into a metal shaft portion 418b having a cross-section defining a cylindrical shape.

Composite impeller portion 422 includes an attachment portion 428 with a passage having a surface 430 whose cross-section is complementary to the shape of metal shaft portion 418a.

Metal ring portion 424 includes a first portion 432 having a first interface 436 with attachment portion 428 and a second portion 434 having a second interface 438 with a first portion 438a and a second portion 438b. Note that the second interface first portion 438a extends longitudinally and the second interface second portion 438b extends radially relative to the axis of the metal shaft portion 418a. First interface 436 is contiguous with the second portion of second interface 438b and also extends radially.

During assembly of machine rotor 416, composite impeller portion 422 is positioned on metal shaft portion 418. Metal ring portion 424 is then shrink fit into engagement with metal shaft portion 418a and composite impeller portion 422 thereby securing composite impeller portion 422 to the shaft portion 418a.

During operation, the complementary surfaces of attachment portion 428 and metal shaft portion 418a provide torque transmission between composite impeller portion 422 and shaft portion 418a. A radius 448 on the outer surface of the first portion 432 of metal ring portion 424 provides improved flow for composite impeller portion 422.

Figure 11:
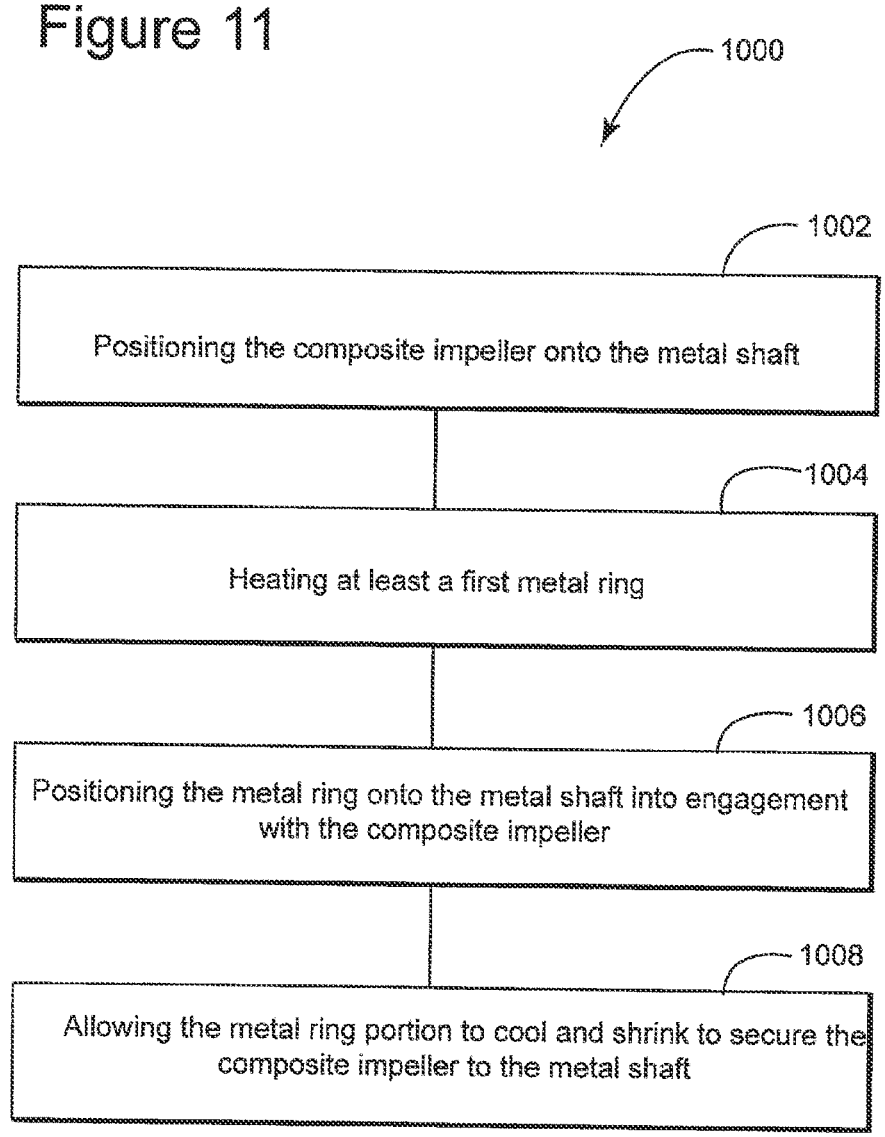
FIG. 11 shows a flow chart of an exemplary embodiment.

According to an embodiment as shown in the flowchart of FIG. 11, a method (1000) of securing a composite impeller to a metal shaft of a machine rotor can include the steps of positioning (1002) the composite impeller onto the metal shaft portion, heating (1004) at least a first metal ring and positioning (1006) the metal ring onto the metal shaft into engagement with the composite impeller, and (1008) allowing the metal ring portion to cool and shrink thereby securing the composite impeller portion to said metal shaft portion in at least one of a radial direction and a longitudinal direction relative to an axis of the machine rotor.

The above-described embodiments are intended to be illustrative in all respects, rather than restrictive, of the present invention. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A rotary machine, comprising:
   a machine stator; and
   a machine rotor rotatable relative to the machine stator and comprising a metal shaft portion, a composite impeller, and at least one first metal ring portion securing the composite impeller to the metal shaft portion, the at least one first metal ring portion comprising a first interface with the composite impeller and a second interface with the metal shaft portion,
   wherein the composite impeller comprises a composite impeller portion and a metal attachment portion for engaging the metal shaft portion;
   wherein the metal attachment portion comprises a hub portion and a radially extending portion extending radially outwardly from the hub portion, and
   wherein at least a part of the radially extending portion is positioned between a part of the first metal ring portion and an outer surface of the composite impeller portion.

2. The rotary machine of claim 1, wherein a force exerted by the at least one first metal ring portion against the composite impeller is configured to prevent movement between the composite impeller and the metal shaft portion.

3. The rotary machine of claim 2, wherein a force exerted by the at least one first metal ring portion against the metal shaft portion is configured to prevent movement between the at least one first metal ring portion and the metal shaft portion.

4. The rotary machine of claim 3, wherein the at least one first metal ring portion is disposed on a first side of the composite impeller, and a second metal ring portion is disposed on a second side of the composite impeller, the second metal ring portion further securing the composite impeller to the metal shaft portion, the second metal ring portion comprising a first interface with the composite impeller and a second interface with the metal shaft portion.

5. The rotary machine of claim 4, wherein the first interface of the at least one first metal ring portion defines a tubular shape, and the second interface of the at least one first metal ring portion defines a tubular shape.

6. The rotary machine of claim 2, wherein the at least one first metal ring portion is disposed on a first side of the composite impeller, and a second metal ring portion is disposed on a second side of the composite impeller, the second metal ring portion further securing the composite impeller to the metal shaft portion, the second metal ring portion comprising a first interface with the composite impeller and a second interface with the metal shaft portion.

7. The rotary machine of claim 2, wherein the composite impeller comprises an attachment portion for engaging the metal shaft portion.

8. The rotary machine of claim 2, wherein the first interface of the at least one first metal ring portion defines a tubular shape, and the second interface of the at least one first metal ring portion defines a tubular shape.

9. The rotary machine of claim 1, wherein a force exerted by the at least one first metal ring portion against the metal shaft portion is configured to prevent movement between the at least one first metal ring portion and the metal shaft portion.

10. The rotary machine of claim 1, wherein the at least one first metal ring portion is disposed on a first side of the composite impeller, and a second metal ring portion is disposed on a second side of the composite impeller, the second metal ring portion further securing the composite impeller to the metal shaft portion, the second metal ring portion comprising a first interface with the composite impeller and a second interface with the metal shaft portion.

11. The rotary machine of claim 1, wherein the first interface defines a tubular shape, and the second interface defines a tubular shape.

12. A machine rotor, comprising:
    a metal shaft;
    a composite impeller comprising a composite impeller portion and an attachment portion comprising a metal portion, the composite impeller being disposed on the metal shaft; and
    a metal ring shrink fit to the attachment portion and the metal shaft to secure the composite impeller to the metal shaft,
    wherein the attachment portion comprises a hub portion and a radially extending portion extending radially outwardly from the hub portion, and wherein at least a part of the radially extending portion is positioned between a part of the metal ring and an outer surface of the composite impeller portion.

13. A method of securing a composite impeller to a metal shaft of a machine rotor, the method comprising:
    positioning the composite impeller onto the metal shaft;
    heating at least one first metal ring;
    positioning the at least one first metal ring onto the metal shaft; and
    allowing the at least one first metal ring to cool and shrink into engagement with the composite impeller and the metal shaft to secure the composite impeller to the metal shaft,
    wherein the composite impeller comprises a composite impeller portion and a metal attachment portion for engaging the metal shaft;
    wherein the metal attachment portion comprises a hub portion and a radially extending portion extending radially outwardly from the hub portion, and wherein at least a part of the radially extending portion is positioned between a part of the at least one first metal ring and an outer surface of the composite impeller portion.

* * * * *